(12) United States Patent
Schnitzler et al.

(10) Patent No.: US 11,203,679 B2
(45) Date of Patent: Dec. 21, 2021

(54) USE OF RUTHENIUM AND OSMIUM CATALYSTS FOR THE METATHESIS OF NITRILE RUBBER

(71) Applicant: ARLANXEO DEUTSCHLAND GMBH, Dormagen (DE)

(72) Inventors: Silvia Schnitzler, Jüchen (DE); Sarah David, Dormagen (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 17/050,975

(22) PCT Filed: Apr. 26, 2019

(86) PCT No.: PCT/EP2019/060717
§ 371 (c)(1),
(2) Date: Oct. 27, 2020

(87) PCT Pub. No.: WO2019/207096
PCT Pub. Date: Oct. 31, 2019

(65) Prior Publication Data
US 2021/0130590 A1   May 6, 2021

(30) Foreign Application Priority Data
Apr. 27, 2018 (EP) .................. 18169929

(51) Int. Cl.
*C08C 19/02* (2006.01)
*C08L 9/02* (2006.01)
*B01J 31/22* (2006.01)
*C08C 19/00* (2006.01)

(52) U.S. Cl.
CPC ............ *C08L 9/02* (2013.01); *B01J 31/2208* (2013.01); *B01J 31/2278* (2013.01); *C08C 19/02* (2013.01); *B01J 2231/546* (2013.01); *B01J 2231/645* (2013.01); *B01J 2531/821* (2013.01); *C08C 2019/09* (2013.01)

(58) Field of Classification Search
CPC .................. C08C 2019/09; B01J 31/2278
See application file for complete search history.

(56) References Cited

U.S. PATENT DOCUMENTS

| 3,700,637 A | 10/1972 | Finch, Jr. |
| 4,464,515 A | 8/1984 | Rempel et al. |
| 4,503,196 A | 3/1985 | Rempel et al. |
| 4,631,315 A | 3/1986 | Buding et al. |
| 4,581,417 A | 4/1986 | Buding et al. |
| 4,746,707 A | 5/1988 | Fiedler et al. |
| 4,795,788 A | 1/1989 | Himmler et al. |
| 4,816,525 A | 3/1989 | Rempel et al. |
| 4,978,771 A | 12/1990 | Fiedler et al. |
| 6,683,136 B2 | 1/2004 | Guo et al. |
| 8,609,782 B2 | 12/2013 | Obrecht et al. |
| 2007/0208206 A1* | 9/2007 | Obrecht ............ B01J 31/0268 585/645 |
| 2014/0005408 A1* | 1/2014 | Skowerski ............ C07C 6/06 548/103 |
| 2015/0344416 A1 | 12/2015 | Dubois et al. |

FOREIGN PATENT DOCUMENTS

| DE | 2 539 132 A1 | 3/1977 |
| DE | 34 33 392 A1 | 3/1986 |
| DE | 35 29 252 A1 | 2/1987 |
| DE | 35 40 918 A1 | 5/1987 |
| DE | 35 41 689 A1 | 5/1987 |
| EP | 0 134 023 A | 3/1985 |
| EP | 0 213 422 A2 | 3/1987 |
| EP | 0 298 386 A2 | 1/1989 |
| EP | 0 471 250 A | 2/1992 |
| EP | 1 826 220 A2 | 8/2007 |
| EP | 2 028 194 A | 2/2009 |
| WO | 2004/035596 A | 4/2004 |
| WO | 2008/034552 A1 | 3/2008 |
| WO | 2011/023674 A | 3/2011 |
| WO | 2013/057289 A | 4/2013 |
| WO | 2013/127880 A | 9/2013 |
| WO | 2014/001109 A | 1/2014 |
| WO | 2014/076548 A | 5/2015 |
| WO | 2017/055945 A | 4/2017 |

OTHER PUBLICATIONS

PCT International Search Report and Written Opinion dated Aug. 22, 2019, and issued in connection with PCT International Application No. PCT/EP2019/060717.
Bujok, R. et al., "Ortho- and Para-Substituted Hoveyda-Grubbs Carbenes. An Improved Synthesis of Highly Efficient Metathesis Initiators", J. Org. Chem. 2004, 69, 6894-6896.
K. Grela, S. Harutyunyan, A. Michrowska "A New Highly Efficient Ruthenium Catalyst for Metathesis Reaction" Angew. Chem. Int. Ed., 41, 4038-4040, (2002).
Skowerski et al., "Efficient, durable and resuable olefin metathesis catalysts with high affinity to silica gel", Tetrahedron 69 (2013), 7408-7415.

* cited by examiner

*Primary Examiner* — Robert C Boyle
(74) *Attorney, Agent, or Firm* — Norris McLaughlin, P.A.

(57) ABSTRACT

The present invention relates to the use of Ru and Os carbene complexes with a hydroxamic acid (ester) function for the metathesis degradation of nitrile rubber (NBR). The invention further relates to a method for producing hydrogenated nitrile rubbers, by subjecting a nitrile rubber to a metathesis degradation in the presence of the said catalyst, and the degraded nitrile rubber obtained subsequently undergoes a hydrogenation, preferably in situ.

13 Claims, No Drawings

USE OF RUTHENIUM AND OSMIUM CATALYSTS FOR THE METATHESIS OF NITRILE RUBBER

This application is a § 371 national stage of PCT International Application No. PCT/EP2019/060717, filed Apr. 26, 2019, which claims foreign priority benefit under 35 U.S.C. § 119 of European Patent Application No. 18169929.9, filed Apr. 27, 2018, the entire disclosures of each of which are incorporated herein by reference.

The present invention relates to the use of special catalysts for the metathesis degradation of nitrile rubber (NBR).

The invention further relates to a method for producing nitrile rubber with a reduced molecular weight, using special catalysts.

Nitrile rubbers, also abbreviated to "NBR", are rubbers which are copolymers or terpolymers of at least one α,β-unsaturated nitrile, at least one conjugated diene and optionally one or more further copolymerizable monomers.

Hydrogenated nitrile rubber, abbreviated to "HNBR", is produced by hydrogenating nitrile rubber. Correspondingly, in HNBR, the C=C double bonds of the copolymerized diene units are fully or partly hydrogenated. The degree of hydrogenation of the copolymerized diene units is typically within a range from 50 to 100%.

Hydrogenated nitrile rubber is a speciality rubber having a very good heat resistance, excellent resistance to ozone and chemicals and excellent oil resistance.

The aforementioned physical and chemical properties of HNBR are combined with very good mechanical properties, especially a high abrasion resistance. For this reason, HNBR has found wide use in a wide variety of different areas of application. HNBR is used, for example, for seals, hoses, drive belts and damping elements in the automotive sector, and also for stators, well seals and valve seals in the oil production sector, and also for numerous parts in the aviation industry, the electrical industry, in mechanical engineering and in shipbuilding.

The HNBR types commercially available on the market typically have a Mooney viscosity (ML 1+4 at 100° C.) in the range from 55 to 105, which corresponds to a weight-average molecular weight Mw (determination method: gel permeation chromatography (GPC) against polystyrene equivalent) in the range from approximately 200 000 to 500 000. The polydispersity indices PDI (PDI=Mw/Mn, where Mw is the weight-average and Mn the number-average molecular weight) to be measured here, which give an indication as to the breadth of the molecular weight distribution, commonly have a value of 3 or above. The residual double bond content is generally in a range from 1 to 18% (determined by IR spectroscopy).

Large restrictions are placed on the processability of HNBR by the relatively high Mooney viscosity. For many applications, an HNBR type having a low molecular weight and hence a lower Mooney viscosity is desirable. This would significantly improve the processability.

Olefin metathesis (hereinafter also referred to as metathesis degradation or metathesis reaction) is a reaction for reducing the molecular weight which is of enormous economic importance. The prior art discloses numerous methods for the metathesis of olefins, for example NBR.

Thus, for example, it is known from WO-A-2004/035596, WO-A-2013/127880 and WO-A-2014/001109 that ruthenium complexes of the general formula (A)

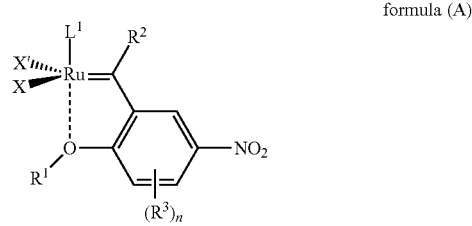

formula (A)

can be used as catalysts for metathesis reactions. These complexes are characterized by nitro-substitution on the benzylidene ligand. The catalyst is used for the synthesis of fine chemicals, natural products and also biologically active components.

WO-A-2014/001109 discloses metal complexes of the general formula (B)

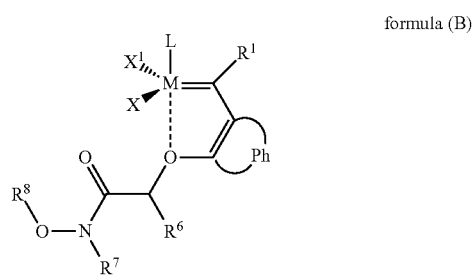

formula (B)

and the use thereof in metathesis reactions, wherein M is ruthenium or osmium, L is a neutral ligand, X and $X^1$ are anionic ligands, $R^1$ is hydrogen and $R^6$, $R^7$ and $R^8$ is $C_1$-$C_6$ alkyl. The use of the catalysts for the metathesis of nitrile rubbers is not disclosed.

WO-A-2017/055945 discloses a process for producing ruthenium complexes of the formula (C)

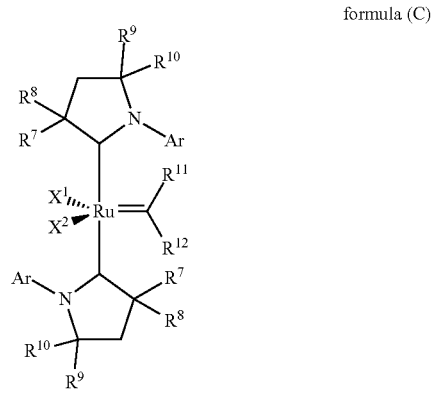

formula (C)

and also the use of these ruthenium complexes as catalysts in olefin metathesis reactions.

WO-A-2014/076548 discloses ruthenium complexes of the general formula (D)

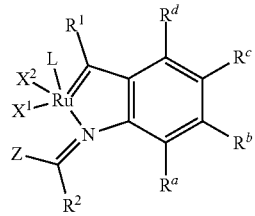

formula (D)

as catalysts for the metathesis of olefins. The use of the catalysts for the metathesis of nitrile rubbers is not disclosed.

EP-A-1 826 220 discloses the use of special catalysts, for example the commercially available nitro-Grela AS2032 catalyst, the Hoveyda-Grubbs II catalyst or the Zhan 1B catalyst for the metathesis degradation of nitrile rubbers.

EP-A-2 028 194 discloses methods for the molecular weight degradation of nitrile rubber, comprising a metathesis degradation of a nitrile rubber in the presence of a Grubbs III catalyst.

WO-A-2008/034552 discloses compounds of the formula (E)

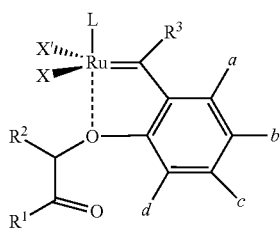

formula (E)

and also the production thereof and use thereof as catalysts in different metathesis reactions. These catalysts are also known by the name "Arlt catalysts".

WO-A-2011/023674 discloses methods for the metathesis degradation of nitrile rubber in the presence of special metathesis catalysts, for example the "Arlt catalysts".

WO-A-2013/057289 discloses a process which comprises firstly subjecting a nitrile rubber to a molecular weight degradation in a metathesis reaction by contacting the nitrile rubber in the absence or presence of a co-olefin with a complex catalyst according to general formula (A) then a) contacting the complex catalyst which is present in the reaction mixture after the metathesis reaction with at least one co-catalyst in a molar ratio of complex catalyst to co-catalyst in the range of 1:(1-550), preferably 1:(20-550) wherein the co-catalyst must contain at least one vinyl group in order to form a catalyst composition and thereafter b) hydrogenating the nitrile rubber in the presence of the novel catalyst composition formed in step a).

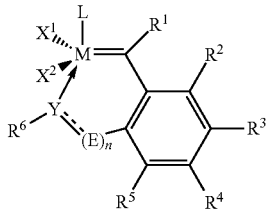

(A)

Skowerski et al., Tetrahedron 69 (2013), 7408-7415 discloses new Scorpio type olefin metathesis catalysts bearing hydroxamic ester groups. Especially complex 5b exhibits high activity and efficiency in RCM and CM.

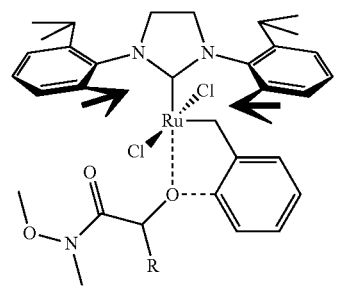

5a: R = H, 62%
5b: R = Me, 72%

US 2015/344416 discloses a process for the synthesis of an unsaturated fatty compound by cross metathesis (and in particular for the synthesis of a nitrile-ester/acid) in which the amount of coproducts resulting from the homometathesis reactions is reduced and the amount of catalyst consumed is also reduced. The invention is based on the discovery that the use of at least two different catalysts, in a particular order, makes it possible to minimize the yield in terms of coproduct. The performance levels of the reaction are thus better than with a single catalyst or with a mixture of catalysts. One of the catalysts mentioned is the following catalyst:

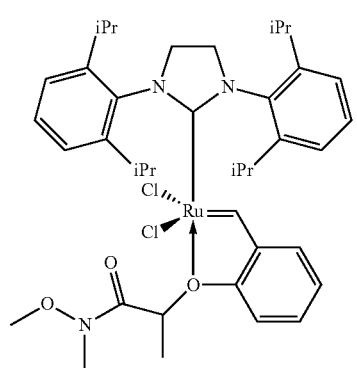

(A-6)

The prior art shows that there is a great need for stable, inexpensive metathesis catalysts which have a high activity in metathesis reactions with nitrile rubber and enable a metathesis reaction of nitrile rubber in a short period of time. Furthermore, the prior art teaches that it cannot be readily assumed that known ruthenium complexes are equally suitable for all types of metathesis of each olefin.

The known metathesis catalysts are as yet unsatisfactory for specific end uses, especially for the metathesis of nitrile rubber.

Accordingly, it was an object of the present invention to provide suitable catalysts for the metathesis of nitrile rubber (NBR) with metathesis activity, preferably with improved metathesis activity in the metathesis degradation of nitrile rubber.

Surprisingly, this object was achieved by using catalysts of the formulae (I) and (III) shown below.

The solution to the object and the subject of the invention is therefore a method for the metathesis of nitrile rubber comprising the step of using catalysts of the following general formula (B) described below in detail, and also a method for the metathesis of nitrile rubber comprising the step of using the catalysts of the formulae (I) and (III) in.

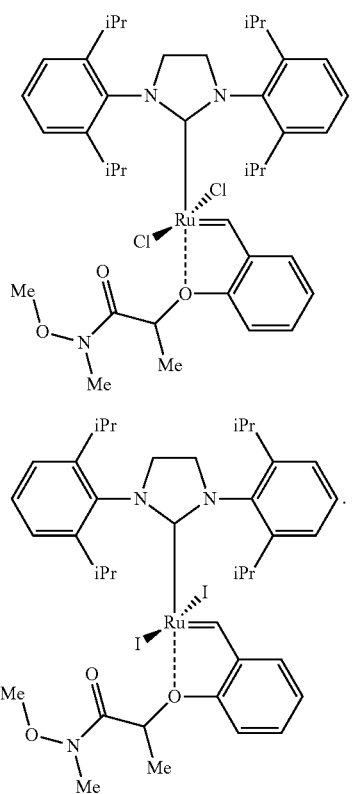

Surprisingly, it is possible, using the catalysts of the formulae (I) and (III), to carry out the metathesis degradation of nitrile rubber without perceptible gel formation. The catalyst of the formula (I) moreover has a higher metathesis activity than the Grubbs II catalyst, Hoveyda-Grubbs II catalyst or nitro-Grela catalyst known from the prior art for the metathesis of nitrile rubber.

The term "substituted" used in the context of this application means that a hydrogen atom on a given radical or atom is replaced by one of the groups specified in each case, with the proviso that the valency of the given atom is not exceeded and the substitution leads to a stable compound.

In the context of this application and invention, all definitions of radicals, parameters or elucidations given above and below, in general terms or within areas of preference, can be combined with one another in any desired manner, so including between the respective areas and areas of preference.

Catalysts

Catalysts which are suitable for use in a method for the metathesis of nitrile rubber are those of the general formula (B)

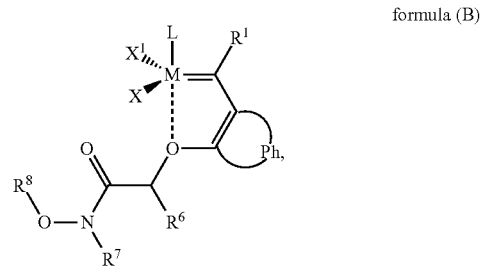

wherein
M is ruthenium or osmium;
X and $X^1$ are each, independently of one another, anionic ligands,
L is a neutral ligand,
$R^1$ is hydrogen, $C_1$-$C_{20}$ alkyl or $C_5$-$C_{10}$ aryl;

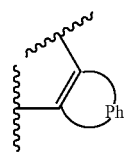 [SMILES: */C=C\*]

is an optionally substituted o-phenylene, wherein 2 or more substituents of the o-phenylene form an optionally substituted $C_4$-$C_8$ ring or an optionally substituted aromatic $C_5$-$C_{14}$ ring; and
$R^6$, $R^7$, and $R^8$ are each independently hydrogen, $C_1$-$C_6$ alkyl, optionally substituted $C_4$-$C_{10}$ heterocycle or optionally substituted $C_5$-$C_{14}$ aryl; wherein $R^7$ and $R^8$ can form a substituted or unsubstituted $C_4$-$C_8$ cyclic system.

Catalysts of the general formula (B) and also the production thereof are disclosed in WO-A-2014/001109.

Preferred catalysts of the general formula (B) are the catalysts of the formula (I) and (111), particularly preferably catalysts of the formula (I).

Catalysts which are particularly suitable for use in a method for the metathesis of nitrile rubber are the catalysts (I) and (III)

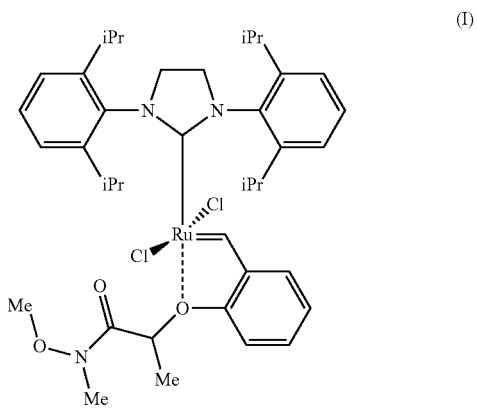

(III)

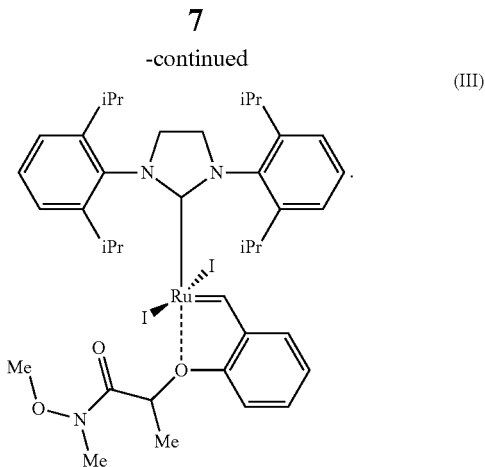

In the context of the inventive method, a nitrile rubber is subjected to a metathesis reaction in the presence of a catalyst of the formula (I) and (III).

Formula (I)—"GreenCat AS2034": [1,3-Bis(2,6-di-i-propylphenyl)imidazolidin-2-ylidene]{2-[[1-(methoxy(methypamino)-1-oxopropan-2-yl]oxy]benzylidene}ruthenium(II) dichloride (CAS number: 1448663-06-6); $C_{39}H_{53}Cl_2N_3O_3Ru$; molecular weight: 783.33 g/mol; green powder. The catalyst is commercially available from Apeiron or Strem. The production of the catalyst is known to those skilled in the art from WO-A-2014/001109.

Formula (III)—"GreenCat I2": [1,3-Bis(2,6-di-i-propylphenyl)imidazolidin-2-ylidene][(2-((1-methoxy(methypamino)-1-oxopropan-2-yl)oxy]benzylidenediiodoruthenium(II); $C_{39}H_{53}I_2N_3O_3Ru$; molecular weight: 966.74° g/mol; green powder. The catalyst is commercially available from Apeiron or Strem. The production of the catalyst is known to those skilled in the art from WO-A-2014/001109.

Particular preference is given to the use of the catalyst of the formula (I) (GreenCat AS2034) for the metathesis of nitrile rubber. The catalyst of the formula (I) has a higher metathesis activity in the metathesis degradation of nitrile rubber than the catalysts Grubbs II, Hoveyda-Grubbs and nitro-Grela known from the prior art.

The amount of the catalyst used for the metathesis according to the invention is dependent on the nature and also the catalytic activity of the special catalyst. The amount of catalyst used is 0.001 to 1 phr, preferably 0.002 to 0.1 phr, especially 0.004 to 0.008 phr, based on the nitrile rubber used.

The metathesis of nitrile rubber can be carried out without, or else in the presence of, a co-olefin. This is preferably a straight-chain or branched $C_2$-$C_{16}$ olefin. Suitable examples are ethylene, propylene, isobutene, styrene, 1-hexene or 1-octene. Preference is given to using 1-hexene or 1-octene.

Also suitable are co-olefins having two or more double bonds or containing one double bond and one carboxylic acid group or hydroxyl group. If the co-olefin is liquid (like 1-hexene for example), the amount of the co-olefin is preferably within a range from 0.2 wt % to 20 wt %, based on the nitrile rubber used. If the co-olefin is a gas, like ethylene for example, the amount of the co-olefin is chosen so as to establish a pressure in the range from $1 \times 10^5$ Pa to $1 \times 10^7$ Pa in the reaction vessel at room temperature, preferably a pressure in the range from $5.2 \times 10^5$ Pa to $4 \times 10^6$ Pa.

The metathesis reaction can be conducted in a suitable solvent that does not deactivate the catalyst used, nor adversely affect the reaction in any other way. Preferred solvents include, but are not limited to, dichloromethane, benzene, chlorobenzene, toluene, methyl ethyl ketone, acetone, tetrahydrofuran, tetrahydropyran, dioxane, and cyclohexane. The particularly preferred solvent is chlorobenzene. In some cases, when the co-olefin itself can function as solvent, as in the case of 1-hexene for example, it is also possible to dispense with the addition of a further additional solvent.

The concentration of the nitrile rubber used in the reaction mixture for the metathesis is not critical, but it should of course be noted that the reaction should not be adversely affected by an excessively high viscosity of the reaction mixture and the associated mixing problems. Preferably, the concentration of the nitrile rubber in the reaction mixture is in the range from 1 to 20 wt %, particularly preferably in the range from 5 to 15 wt %, based on the overall reaction mixture.

The metathesis degradation is typically conducted at a temperature in the range from 10° C. to 150° C., preferably in the range from 20° C. to 100° C.

The reaction time depends on a number of factors, for example on the type of nitrile rubber, the type of catalyst, the catalyst concentration used and the reaction temperature. Typically, the reaction has ended within three hours under normal conditions. The progress of the metathesis can be monitored by standard analysis, for example can be followed by GPC measurements or by determining the viscosity.

Nitrile Rubber (NBR)

As nitrile rubbers in the metathesis reaction, use may be made of copolymers or terpolymers which comprise repeat units of at least one conjugated diene, at least one α,β-unsaturated nitrile and optionally one or more further copolymerizable monomers.

Any conjugated diene can be used. Preference is given to using ($C_4$-$C_6$) conjugated dienes. Particular preference is given to 1,3-butadiene, isoprene, 2,3-dimethylbutadiene, piperylene or mixtures thereof. 1,3-Butadiene and isoprene or mixtures thereof are especially preferred. Very particular preference is given to 1,3-butadiene.

The α,β-unsaturated nitrile used may be any known α,β-unsaturated nitrile, preference being given to ($C_3$-$C_5$)-α,β-unsaturated nitriles such as acrylonitrile, methacrylonitrile, ethacrylonitrile or mixtures thereof. Particular preference is given to acrylonitrile.

A particularly preferred nitrile rubber is thus a copolymer of acrylonitrile and 1,3-butadiene.

As well as the conjugated diene and the α,β-unsaturated nitrile, it is also possible to use one or more further copolymerizable monomers known to those skilled in the art, e.g. α,β-unsaturated monocarboxylic or dicarboxylic acids or esters or amides thereof. Preferred α,β-unsaturated monocarboxylic or dicarboxylic acids are fumaric acid, maleic acid, acrylic acid and methacrylic acid. Esters of the α,β-unsaturated carboxylic acids used are preferably the alkyl esters and alkoxyalkyl esters thereof. Particularly preferred alkyl esters of the α, β-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl esters of the α,β-unsaturated carboxylic acids are methoxyethyl (meth)acrylate and ethoxyethyl (meth)acrylate. Use may also be made of mixtures of the abovementioned copolymerizable monomers.

As well as the α,β-ethylenically unsaturated nitrile units and the conjugated diene units, as further copolymerizable monomer, use may be made of a PEG acrylate of the general formula (X)

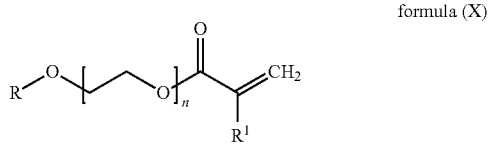

formula (X)

wherein

R is hydrogen or branched or unbranched $C_1$-$C_{20}$ alkyl, preferably methyl, ethyl, butyl or ethylhexyl, n is 1 to 8, preferably 2 to 8, particularly preferably 2 to 5 and very particularly preferably 2 and $R^1$ is hydrogen or $CH_3$—.

In the context of the present invention the term "(meth)acrylate" represents "acrylate" and "methacrylate". When the $R^1$ radical of the general formula (I) is $CH_3$—, it is a methacrylate.

The term "polyethylene glycol" or the abbreviation "PEG" in the context of this invention represents both monoethylene glycol sections having one repeat ethylene glycol unit (PEG-1; n=1) and polyethylene glycol sections having 2 to 8 repeat ethylene glycol units (PEG-2 to PEG-8; n=2 to 8).

The term "PEG acrylate" is also abbreviated to PEG-X-(M)A, wherein "X" is the number of repeat ethylene glycol units, "MA" is methacrylate and "A" is acrylate.

Acrylate units derived from PEG acrylates of the general formula (I) are referred to in the context of the present invention as "PEG acrylate unit".

Preferred PEG acrylate units are derived from the PEG acrylates of the following formulae no. 1 to no. 10, where n is 1, 2, 3, 4, 5, 6, 7 or 8, preferably 2, 3, 4, 5, 6, 7 or 8, particularly preferably 2, 3, 4, 5 or 5 and very particularly preferably 2:

| | |
|---|---|
| Polyethylene glycol acrylate (Formula no. 1) | 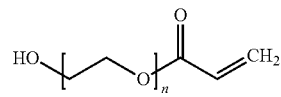 |
| Polyethylene glycol methacrylate (Formula no. 2) | 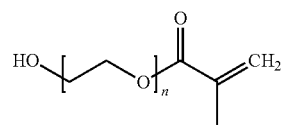 |
| Methoxy polyethylene glycol acrylate (Formula no. 3) | 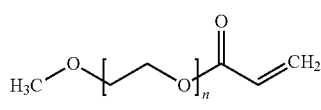 |
| Methoxy polyethylene glycol methacrylate (Formula no. 4) | 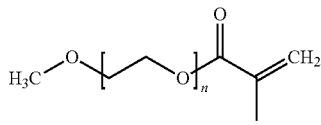 |
| Ethoxy polyethylene glycol acrylate (Formula no. 5) | 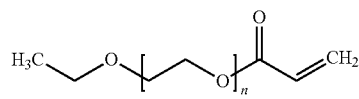 |
| Ethoxy polyethylene glycol methacrylate (Formula no. 6) | 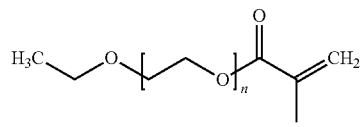 |
| Butoxy polyethylene glycol acrylate (Formula no. 7) | 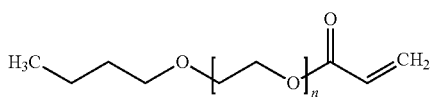 |
| Butoxy polyethylene glycol methacrylate (Formula no. 8) | 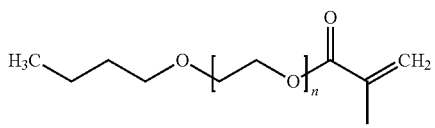 |
| Ethylhexyloxy polyethylene glycol acrylate (Formula no. 9) | 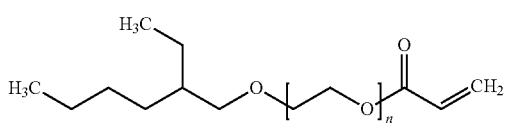 |

| | |
|---|---|
| Ethylhexyloxy polyethylene glycol methacrylate (Formula no. 10) | 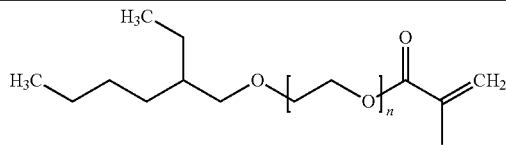 |

Other commonly used names for methoxy polyethylene glycol acrylate (formula no. 3) are, for example, poly(ethylene glycol) methyl ether acrylate, acryloyl-PEG, methoxy-PEG acrylate, methoxy poly(ethylene glycol) monoacrylate, poly(ethylene glycol) monomethyl ether monoacrylate or mPEG acrylate.

These PEG acrylates can be purchased commercially, for example from Arkema under the Sartomer® trade name, from Evonik under the Visiomer® trade name or from Sigma Aldrich.

The proportions of conjugated diene and α,β-unsaturated nitrile in the nitrile rubbers to be employed may fluctuate within wide ranges. The proportion of, or of the sum of, the conjugated diene(s) is typically in the range from 40 to 90 wt %, preferably in the range from 55 to 75 wt %, based on the overall polymer. The proportion of, or of the sum of, the α,β-unsaturated nitrile(s) is typically 10 to 60 wt %, preferably 25 to 45 wt %, based on the overall polymer. The proportions of the monomers in each case add up to 100% by weight. The additional monomers may be present in amounts of 0 to 5 wt %, preferably 0.1 to 40 wt %, particularly preferably 1 to 30 wt %, based on the overall polymer. In this case, corresponding proportions of the conjugated diene(s) and/or of the α,β-unsaturated nitrile(s) are replaced by the proportions of the additional monomers, where the proportions of all monomers in each case add up to 100% by weight.

The production of the nitrile rubbers by polymerization of the aforementioned monomers is sufficiently well-known to those skilled in the art and extensively described in the polymer literature.

Nitrile rubbers which can be used in the sense of the invention are furthermore commercially available, e.g. as products from the product series of the trade names Perbunan® and Krynac® from the company ARLANXEO Deutschland GmbH, of the trade name Nipol® from the company Zeon, of the trade name Europrene® from the company Versalis, of the trade name Nancar® from the company Nantex or of the trade name KNB from the company Kumho.

The nitrile rubbers used for metathesis have a Mooney viscosity (ML 1+4 at 100° C.) in the range from 30 to 70, preferably from 30 to 50. This corresponds to a weight-average molecular weight Mw in the range from 200 000 to 500 000, preferably in the range from 200 000 to 400 000. The nitrile rubbers used also have a polydispersity PDI=Mw/Mn, where Mw is the weight-average and Mn the number-average molecular weight, in the range from 2.0 to 6.0, preferably in the range from 3.0 to 5.0 and particularly preferably in the range from 3.5 to 4.5.

The Mooney viscosity is determined here to ASTM Standard D 1646.

The nitrile rubbers obtained by the inventive method of metathesis degradation have a Mooney viscosity (ML 1+4 at 100° C.) in the range from 5 to 30, preferably from 5 to 20. This corresponds to a weight-average molecular weight Mw in the range from 10 000 to 200 000, preferably in the range from 10 000 to 150 000. The nitrile rubbers obtained also have a polydispersity PDI=Mw/Mn, where Mn is the number-average molecular weight, in the range from 1.5 to 4.0, preferably in the range from 1.7 to 3.

Hydrogenation

A hydrogenation of the degraded nitrile rubbers obtained may be adjoined to the inventive method of metathesis degradation. This can be effected in the manner known to those skilled in the art.

It is possible to conduct the hydrogenation using homogeneous or heterogeneous hydrogenation catalysts. It is also possible to conduct the hydrogenation in situ, i.e. in the same reaction mixture in which the metathesis degradation was also carried out beforehand and without the need to isolate the degraded nitrile rubber. The hydrogenation catalyst is simply added to the reaction vessel.

The catalysts used are based typically on rhodium, ruthenium or titanium, but it is also possible to use platinum, iridium, palladium, rhenium, ruthenium, osmium, cobalt or copper, either as the metal or else preferably in the form of metal compounds (see, for example, U.S. Pat. No. 3,700,637, DE-A-2 539 132, EP-A-0 134 023, DE-OS-35 41 689, DE-OS-35 40 918, EP-A-0 298 386, DE-OS-35 29 252, DE-OS-34 33 392, U.S. Pat. Nos. 4,464,515 and 4,503,196).

Suitable catalysts and solvents for a hydrogenation in homogeneous phase are described hereinafter and are also known from DE-A-25 39 132 and EP-A-0 471 250.

The selective hydrogenation can be achieved, for example, in the presence of a rhodium- or ruthenium-containing catalyst. Use may for example be made of a catalyst of the general formula $(R^1{}_mB)_lMX_n$, in which M is ruthenium or rhodium, $R^1$ are identical or different and are a $C_1$-$C_8$ alkyl group, a $C_4$-$C_8$ cycloalkyl group, a $C_6$-$C_{15}$ aryl group or a $C_7$-$C_{15}$ aralkyl group. B is phosphorus, arsenic, sulfur or a sulfoxide group (S=O), X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulfoxide)rhodium (III) chloride, and also tetrakis(triphenylphosphine)rhodium hydride of the formula $((C_6H_5)_3P)_4RhH$ and the corresponding compounds in which the triphenylphosphine has been replaced fully or partly by tricyclohexylphosphine. The catalyst can be used in small amounts. An amount in the range of 0.01 to 1 wt %, preferably in the range of 0.03 to 0.5 wt % and more preferably in the range of 0.1 to 0.3 wt %, based on the weight of the polymer, is suitable.

It is typically advisable to use the catalyst together with a co-catalyst which is a ligand of the formula $R^1mB$, wherein $R^1$, m and B are each as defined above for the catalyst. Preferably, m is 3, B is phosphorus and the $R^1$ radicals may be the same or different. The co-catalysts preferably have trialkyl, tricycloalkyl, triaryl, triaralkyl, diaryl monoalkyl, diaryl monocycloalkyl, dialkyl monoaryl, dialkyl monocycloalkyl, dicycloalkyl monoaryl or dicycloalkyl monoaryl radicals.

Examples of co-catalysts can be found, for example, in U.S. Pat. No. 4,631,315. A preferred co-catalyst is triphenylphosphine. The co-catalyst is used preferably in amounts in a range from 0.3 to 5 wt %, preferably in the range from 0.5 to 4 wt %, based on the weight of the nitrile rubber to be hydrogenated. Preferably, in addition, the weight ratio of the rhodium-containing catalyst to the co-catalyst is in the range from 1:3 to 1:55, preferably in the range from 1:5 to 1:45. Based on 100 parts by weight of the nitrile rubber to be hydrogenated, in a suitable manner, 0.1 to 33 parts by weight of the co-catalyst, preferably 0.5 to 20 and very particularly preferably 1 to 5 parts by weight, especially more than 2 but less than 5 parts by weight, of the co-catalyst are used, based on 100 parts by weight of the nitrile rubber to be hydrogenated.

The practical conduct of this hydrogenation is sufficiently well-known to those skilled in the art from U.S. Pat. No. 6,683,136. It is effected typically by contacting the nitrile rubber to be hydrogenated with hydrogen in a solvent such as toluene or monochlorobenzene at a temperature in the range from 100 to 150° C. and a pressure in the range from 50 to 150 bar for 2 to 10 h.

Hydrogenation is understood in the context of this invention to mean a conversion of the double bonds present in the starting nitrile rubber to an extent of at least 50%, preferably 70-100%, particularly preferably 80 to 100%.

In the case of use of heterogeneous catalysts, these are typically supported catalysts based on palladium, which are supported, for example, on charcoal, silica, calcium carbonate or barium sulfate.

On completion of the hydrogenation, a hydrogenated nitrile rubber is obtained that has a Mooney viscosity (ML 1+4 at 100° C.), measured to ASTM Standard D 1646, in the range from 10 to 50, preferably from 10 to 30. This corresponds to a weight-average molecular weight Mw in the range from 2000 to 400 000 g/mol, preferably in the range from 20 000 to 200 000. The hydrogenated nitrile rubbers obtained also have a polydispersity PDI=Mw/Mn, where Mw is the weight-average and Mn the number-average molecular weight, in the range from 1 to 5 and preferably in the range from 1.5 to 3.

The catalysts (I) and (III) can be used in the hydrogenation of the nitrile rubber to give hydrogenated nitrile rubber (HNBR).

The invention therefore further relates to a method for reducing the molecular weight of nitrile rubber, characterized in that nitrile rubber is brought into contact with one of the catalysts of the general formulae (I) and (III).

The advantage of the invention is especially the high metathesis activity of the catalysts in the metathesis degradation of nitrile rubber.

EXAMPLES

Metathesis degradation of nitrile rubber in the presence of different catalysts

The following examples show that, in each case at the same dosage, the catalysts of the formula (I) has metathesis activity in the metathesis degradation of nitrile rubber.

The following catalysts were used:

"Grubbs II catalyst" (comparative example 1): [1,3-bis-(2,4,6-trimethylphenyl)-2-imidazolidinylidene]dichloro(phenylmethylene)(tricyclohexylphosphine)ruthenium (CAS number: 246047-72-3), $C_{46}H_{65}Cl_2N_2PRu$ weight: 848.97 g/mol; the Grubbs II catalyst was obtained from the company Materia Inc.

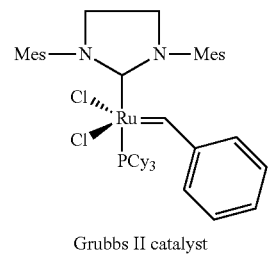

Grubbs II catalyst

"Hoveyda-Grubbs II catalyst" (comparative example 2): [1,3-Bis-(2,4,6-trimethylphenyl)-2-imidazolidinylidene]dichloro(o-isopropoxyphenylmethylene)ruthenium (CAS number: 301224-40-8); $C_{31}H_{38}Cl_2N_2ORu$, weight: 626.62 g/mol; the Hoveyda-Grubbs II catalyst was obtained from the company Materia Inc.

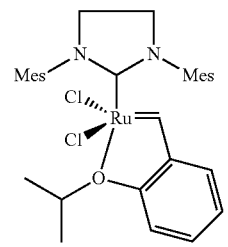

Hoveyda-Grubbs II catalyst

"Nitro-Grela catalyst AS2032" (comparative example 3): [1,3-Bis(2,4,6-trimethylphenylimidazolidine-2-ylidene)]-(2-i-propoxy-5-nitrobenzylidene)ruthenium(II) dichloride (CAS number: 502964-52-5); $C_{31}H_{37}Cl_2N_3O_3Ru$; weight: 671.62 g/mol; green powder. The catalyst is commercially available from Apeiron or Strem. The production of the catalyst is known to those skilled in the art from WO-A-2004/035596 and also K. Grela, S. Harutyunyan, A. Michrowska "A New Highly Efficient Ruthenium Catalyst for Metathesis Reaction" Angew. Chem. Int. Ed., 41, 4038-4040, (2002) or J. Org. Chem. 2004, 69, 6894-6896.

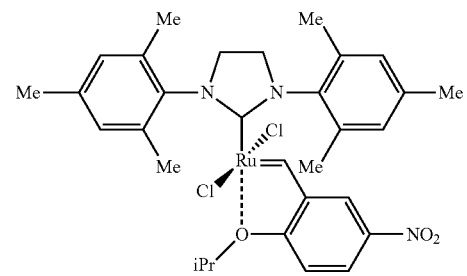

Nitro-Grela catalyst AS2032

Example (I)

"GreenCat AS2034": [1,3-Bis(2,6-di-i-propylphenyl)imidazolidin-2-ylidene]{2-[[1-(methoxy(methypamino)-1-oxo-propan-2-yl]oxy]benzylidene}ruthenium(II) dichloride (CAS number: 1448663-06-6); $C_{39}H_{53}Cl_2N_3O_3Ru$; molecular weight: 783.33 g/mol. The catalyst is commercially available from Apeiron or Strem.

Formula (I)

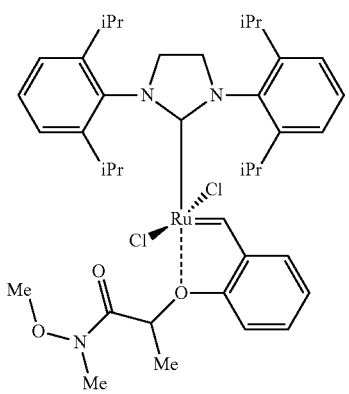

The degradation reactions described below were carried out using a nitrile rubber from ARLANXEO Deutschland GmbH with 34 wt % acrylonitrile content; a Mooney viscosity (ML 1+4 @100° C.) of 34 MU and a residual double bond content (RDB) of 100. This nitrile rubber is abbreviated to NBR below.

General description of the metathesis reactions carried out:

In each case 425 g of chlorobenzene (MCB; Aldrich) were used for the metathesis degradation. 75 g of NBR were dissolved therein at room temperature over a period of 24 h.

TABLE 1

Analytical data of the NBR solution before the metathesis reaction

| Analytical data | NBR solution |
|---|---|
| Mw [g/mol] | 292 406 |
| Mn [g/mol] | 74 461 |
| PDI | 3.9 |

In each case 3.1 g (4 phr) of 1-hexene were added to the NBR solution and mixed thoroughly to homogenize for 120 min on an agitator.

The 0.0049 g of ruthenium-containing catalysts were each dissolved in 5 ml of MCB at room temperature. The catalyst solutions were added to the NBR solutions immediately after the catalyst solutions had been prepared.

After 24 hours the metathesis reaction came to an end, and in each case 5 ml of the reaction solution were used for the GPC.

The molecular weight was determined by gel permeation chromatography (GPC) to DIN-55672-1 version 2007. A modular system comprising a Shodex RI-71 differential refractometer, S 5200 autosampler (from SFD), column oven (ERC-125), Shimadzu LC 10 AT pump and a column combination of 3 PLgel 10 μm Mixed B 300×7.5 mm columns from Agilent was used.

The solvent used was tetrahydrofuran; the molecular weights present are based on polystyrene standards from PSS (Mainz). The finished THF sample solutions are filtered through syringe filters having 0.45 μm PTFE membranes and diameter 25 mm. The measurements were conducted at 40° C. and a flow rate of 1 ml/min in tetrahydrofuran.

The molecular parameters such as number-average molecular weight Mn, mass-average molecular weight Mw and the resulting polydispersity index PDI are determined from the RI signal by means of the "Empower 2 data base" software from Waters.

The following characteristic indices were determined by means of GPC analysis both for the original NBR rubber (before degradation) and for the degraded nitrile rubbers:

Mw [g/mol]: weight-average molecular weight
Mn [g/mol]: number-average molecular weight
PDI: Width of the molecular weight distribution (Mw/Mn)

Activity comparison of the "Grubbs II catalyst", the "Hoveyda-Grubbs II catalyst" and the "nitro-Grela catalyst" with the catalyst of formula (I) in the presence of 4 phr of 1-hexene The activity of the "Grubbs II catalyst", the "Hoveyda-Grubbs II catalyst" and the "nitro-Grela catalyst" with the catalyst of formula (I) were carried out with the inventive catalyst of the formula (I) at a catalyst concentration of 0.0065 phr (0.0049 g) and a dosage of 4.0 phr (3.1 g) of the co-catalyst 1-hexene.

TABLE 2

Molecular weight and PDI of the nitrile rubbers after 24 h of metathesis in the presence of the comparative catalysts V1 to V3 and also the inventive catalysts (I)* and (II)* in comparison to the starting values at the start

| Analytical data | Start 0 h | V1 24 h | V2 24 h | V3 24 h | (I)* 24 h |
|---|---|---|---|---|---|
| Mw [g/mol] | 292 406 | 107 336 | 72 957 | 97 137 | 52 237 |
| Mn [g/mol] | 74 461 | 45 657 | 31 327 | 39 288 | 24 079 |
| PDI | 3.9 | 2.4 | 2.3 | 2.5 | 2.2 |

*Inventive examples

The use of the catalyst (I)* leads to a metathesis degradation of nitrile rubber without perceptible gel formation.

The comparison of the reduction in the weight-average molecular weight Mw of the nitrile rubber in the inventive example (I)* shows that the activity of the catalyst (I) (GreenCat AS2034) is significantly higher than the comparative catalysts used in the comparative examples V1 to V3, Grubbs II catalyst, Hoveyda-Grubbs II catalyst and nitro-Grela catalyst. In each case with the same reaction time, with the catalyst (I) (GreenCat AS2034) lower molecular weights than with the comparative catalysts V1 to V3 are achieved. The inventive catalyst (Iis thus suitable for use in a method for the metathesis of nitrile rubber.

The invention claimed is:

1. A method for the metathesis of nitrile rubber comprising carrying out a metathesis reaction of the nitrile rubber in the presence of a catalyst of formula (I) or (III):

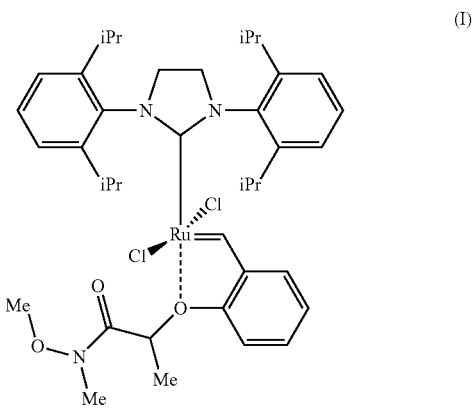

-continued

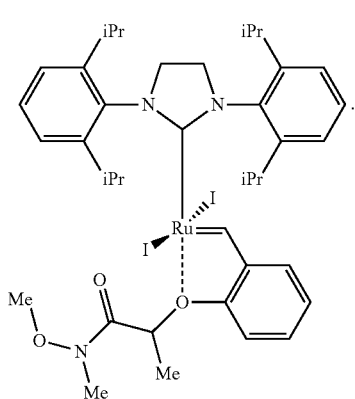
(III)

2. The method according to claim 1, wherein:
the catalyst is present at 0.001 to 1 phr, based on the nitrile rubber.

3. The method according to claim 1, wherein the metathesis reaction is carried out without the presence of a co-olefin.

4. The method according to claim 1, wherein copolymers or terpolymers which comprise repeat units of at least one conjugated diene, at least one α,β-unsaturated nitrile, and optionally one or more further copolymerizable monomers are present in the metathesis reaction as nitrile rubbers.

5. The method according to claim 4, wherein copolymerizable monomers of α,β-unsaturated monocarboxylic or dicarboxylic acids, the esters or amides thereof, the alkoxyalkyl esters thereof, or a PEG acrylate of formula (X):

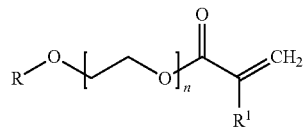
(X)

wherein:
R is hydrogen or a branched or unbranched $C_1$-$C_{20}$ alkyl,
n is 1 to 8, and
$R^1$ is hydrogen or $CH_3$—,
are present in the metathesis reaction.

6. The method according to claim 1, wherein:
the nitrile rubbers have a Mooney viscosity (ML 1+4 at 100° C.) in the range of from 30 to 70.

7. The method according to claim 1, wherein:
the concentration of the nitrile rubber is in the range of from 1 to 20 wt %, based on the total weight of the reaction mixture.

8. The method according to claim 1, wherein the metathesis reaction is carried out in a solvent.

9. The method according to claim 1, wherein the metathesis reaction is carried out at a temperature in the range of from 10° C. to 150° C.

10. The method according to claim 1, wherein the metathesis reaction is carried out in the presence of a co-olefin.

11. The method according to claim 5, wherein mixtures of the copolymerizable monomers are present in the metathesis reaction.

12. A method for producing hydrogenated nitrile rubbers comprising subjecting a nitrile rubber to a metathesis degradation in the presence of a catalyst of the formula (I) or (III):

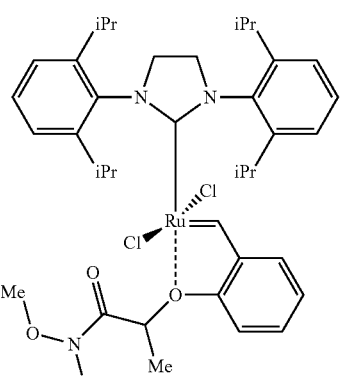
(I)

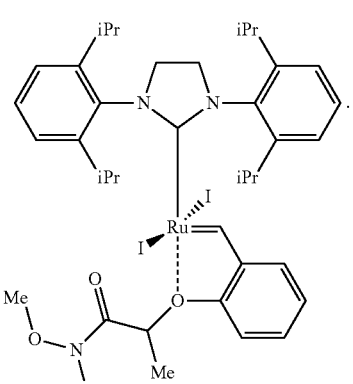
(III)

thereby obtaining a degraded nitrile rubber, wherein the degraded nitrile rubber subsequently undergoes a hydrogenation.

13. The method according to claim 12, wherein the hydrogenation of the degraded nitrile rubber is performed in situ.

* * * * *